US010672239B2

(12) United States Patent
Loermann et al.

(10) Patent No.: US 10,672,239 B2
(45) Date of Patent: Jun. 2, 2020

(54) RESPONSIVE VISUAL COMMUNICATION SYSTEM AND METHOD

(71) Applicant: BRAGI GmbH, München (DE)

(72) Inventors: Arne D. Loermann, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/903,282

(22) Filed: Feb. 23, 2018

(65) Prior Publication Data

US 2018/0218575 A1    Aug. 2, 2018

Related U.S. Application Data

(63) Continuation of application No. 15/244,894, filed on Aug. 23, 2016, now Pat. No. 9,905,088.

(60) Provisional application No. 62/211,726, filed on Aug. 29, 2015.

(51) Int. Cl.
  *G08B 5/36* (2006.01)
  *H04M 1/05* (2006.01)
  *G06F 3/01* (2006.01)
  *H04M 1/725* (2006.01)

(52) U.S. Cl.
  CPC ............. *G08B 5/36* (2013.01); *H04M 1/05* (2013.01); *G06F 3/017* (2013.01); *H04M 1/7253* (2013.01)

(58) Field of Classification Search
  CPC ........ G08B 5/36; H04M 1/05; H04M 1/7253; G06F 3/017
  See application file for complete search history.

(56) References Cited

U.S. PATENT DOCUMENTS

| 2,325,590 A | 8/1943 | Carlisle et al. |
| 2,430,229 A | 11/1947 | Kelsey |
| 3,047,089 A | 7/1962 | Zwislocki |

(Continued)

FOREIGN PATENT DOCUMENTS

| CN | 204244472 U | 4/2015 |
| CN | 104683519 A | 6/2015 |

(Continued)

OTHER PUBLICATIONS

Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.

(Continued)

*Primary Examiner* — Leon Flores
(74) *Attorney, Agent, or Firm* — Goodhue, Coleman & Owens, P.C.

(57) ABSTRACT

A wearable device providing responsive visual feedback is provided. The wearable device includes a wearable device housing, at least one lighting element associated with the housing for providing visual feedback, a processor disposed within the wearable device housing, the processor operatively connected to the at least one lighting element, a plurality of sensors operatively connected to the processor, wherein the processor is programmed to determine a mode of operation using sensed data from the plurality of sensor, and wherein the processor is programmed to control the at least one lighting element to convey visual feedback based on the mode of operation determined by the processor.

18 Claims, 6 Drawing Sheets

(56) References Cited

U.S. PATENT DOCUMENTS

| | | |
|---|---|---|
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,711,062 B2 | 7/2017 | Ellis et al. |
| 9,729,979 B2 | 8/2017 | Özden |
| 9,767,709 B2 | 9/2017 | Ellis |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |

(56) References Cited

U.S. PATENT DOCUMENTS

| | | |
|---|---|---|
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Pérez |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0230019 A1* | 8/2015 | Sakai .................. H04R 1/1041 381/74 |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |

(56) References Cited

U.S. PATENT DOCUMENTS

| | | |
|---|---|---|
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1994 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Lets Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).

(56) References Cited

OTHER PUBLICATIONS

BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness in Mobility", Fountain Valley, Californa (2017).
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before the Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XPO55317584, Yu.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.

\* cited by examiner

RESPONSIVE VISUAL COMMUNICATION SYSTEM AND METHOD

PRIORITY STATEMENT

This application is a continuation of U.S. patent application Ser. No. 15/244,894 filed on Aug. 23, 2016 which claims priority to U.S. Provisional Patent Application No. 62/211,726 filed Aug. 29, 2015, all of which are titled Responsive Visual Communication System and Method and all of which are hereby incorporated by reference in their entirety.

FIELD OF THE INVENTION

The present invention relates to wearable devices. More particularly, but not exclusively, the present invention relates to wearable devices such as earpieces with improved user interfaces.

BACKGROUND

Wearable devices of various varieties are becoming increasingly popular consumer devices. Yet numerous problems exist which may preclude or delay widespread adoption of wearable devices. One of these problems relates to the user interface associated with wearable devices. Wearable devices may be able to perform multiple functions some of which may be complex in nature. Yet, it is desirable to have a user interface which is simple, intuitive, and elegant in design. Further complicating the design of wearable devices is that wearable devices may be exposed to different environments and use conditions than other types of consumer devices. Some of these environments and use conditions create additional problems if using conventional user interfaces.

For example, consider the use of buttons on such a device. Buttons have the disadvantage of requiring a protective membrane around them. This results in a decrease of their tactile feedback as well as complicating the design due to the limitations of the protective membrane. For example, with repeated exposure to caustic or corrosive compounds such as sweat or cerumen, such membranes are well known to become brittle and crack over time, allowing for water contamination of the delicate microelectronic components contained within. Thus, various problems remain with wearable devices, including earpieces.

SUMMARY

Therefore, it is a primary object, feature, or advantage of the present invention to improve over the state of the art.

It is a further object, feature, or advantage of the present invention to provide a wearable device such as an earpiece or set of earpieces which supports multiple modalities.

It is a still further object, feature, or advantage of the present invention to provide a wearable device such as an earpiece or set of earpieces which are water resistant so they may be used in various environments including by a user swimming in a body of water.

Another object, feature, or advantage of the present invention is to provide a wearable device that is not easily damaged by the environments in which it is exposed.

Another object, feature, or advantage of the present invention is to provide for the use of colorimetric light to give visual data and/or feedback to a user.

Yet another object, feature, or advantage of the present invention is to provide a wearable device which provides visual feedback to a user including over operational controls of the device.

Another object, feature of advantage of the present invention is to provide a wearable which allows for activation of optional features, the confirmation of gestural movements, and/or the assessment of embedded device data.

It is a further object, feature, or advantage of the present invention to provide a software application such as a mobile app operating on a mobile device which is programmed to acquire imagery of visual data from a wearable device and interpret the visual data to extract encoded data.

One or more of these and/or other objects, features, or advantages will become apparent from the specification and claims that follow. No single embodiment need provide each and every object, feature or advantage. It is contemplated that different embodiments may have different objects, features, or advantages.

According to one aspect, a wearable device providing responsive visual feedback is provided. The wearable device includes a wearable device housing, at least one lighting element associated with the housing for providing visual feedback, a processor disposed within the wearable device housing, the processor operatively connected to the at least one lighting element, a plurality of sensors operatively connected to the processor, wherein the processor is programmed to determine a mode of operation using sensed data from the plurality of sensor, and wherein the processor is programmed to control the at least one lighting element to convey visual feedback based on the mode of operation determined by the processor.

According to another aspect, a system includes: a wearable device providing responsive visual feedback comprising: a wearable device housing; at least one lighting element associated with the housing for providing visual feedback; a processor disposed within the wearable device housing, the processor operatively connected to the at least one lighting element; a plurality of sensors operatively connected to the processor; wherein the processor is programmed to control the at least one lighting element to encode data. The system further includes a software application executing on a computing device wherein the software application is programmed to acquire imagery of the visual feedback and recover the data.

According to another aspect, a system includes a first wearable device and a second wearable device wherein each of the first wearable device and the second wearable device comprises a wearable device housing, at least one lighting element associated with the housing for providing visual feedback, a processor disposed within the wearable device housing, the processor operatively connected to the at least one lighting element, a plurality of sensors operatively connected to the processor, and wherein the processor is programmed to determine a mode of operation using sensed data from the plurality of sensors, wherein the processor is programmed to control the at least one lighting element to convey visual feedback based on the mode of operation determined by the processor; and wherein the first wearable device and the second wearable device are configured to work in concert to convey visual feedback.

According to another aspect, a method of providing responsive visual feedback from a wearable device includes determining by a processor a mode of operation for the wearable device using sensed data from a plurality of sensors of the wearable device and controlling at least one lighting element of the wearable device based on the mode of operation of the wearable device determined by the processor.

According to another aspect, a method of providing responsive visual feedback from a wearable device includes providing a wearable device comprising (a) a wearable device housing, (b) at least one lighting element associated with the housing for providing visual feedback, (c) a processor disposed within the wearable device housing, the processor operatively connected to the at least one lighting element, and (d) a plurality of sensors operatively connected to the processor. The method further includes determining by the processor a mode of operation for the wearable device using sensed data from the plurality of sensors of the wearable device and controlling at least one lighting element of the wearable device based on the mode of operation of the wearable device determined by the processor.

DETAILED DESCRIPTION

According to one aspect a new earpiece for use in multiple modalities is provided. The device may provide multiple functions including functions of interest to a user performing sports activities, the transmission of audio information for two way conversations, and the measurement of numerous biometric data sets. Of course, the earpiece may also perform additional functions.

Although such a device preferably performs a number of different functions, it is preferred that the wearable device be relatively simple and/or intuitive in operation. In addition, because the device may be used during sports activities it is preferred that the device be water resistant or otherwise adapted for harsh environments. Where the device is water resistant, it is preferred that the device allows the user to interact with it when in the water such as while swimming in a swimming pool, lake, or ocean.

The present invention provides for a new system and method for communication with the user as well as facilitation of device analytics. In particular, colorimetric light is used to give visual data and/or feedback to the user. The device may provide the user feedback over operational controls of the device, activate optional features, confirm gestural movements, allow for assessment of embedded device data such as device build, serial number, build date, etc. as well as to provide for an alternative method for software upload, download and analysis of data. The lights may also be used for other functions such as may be used for diagnostic purposes or to assist developers including for use in debugging.

Figure 1:
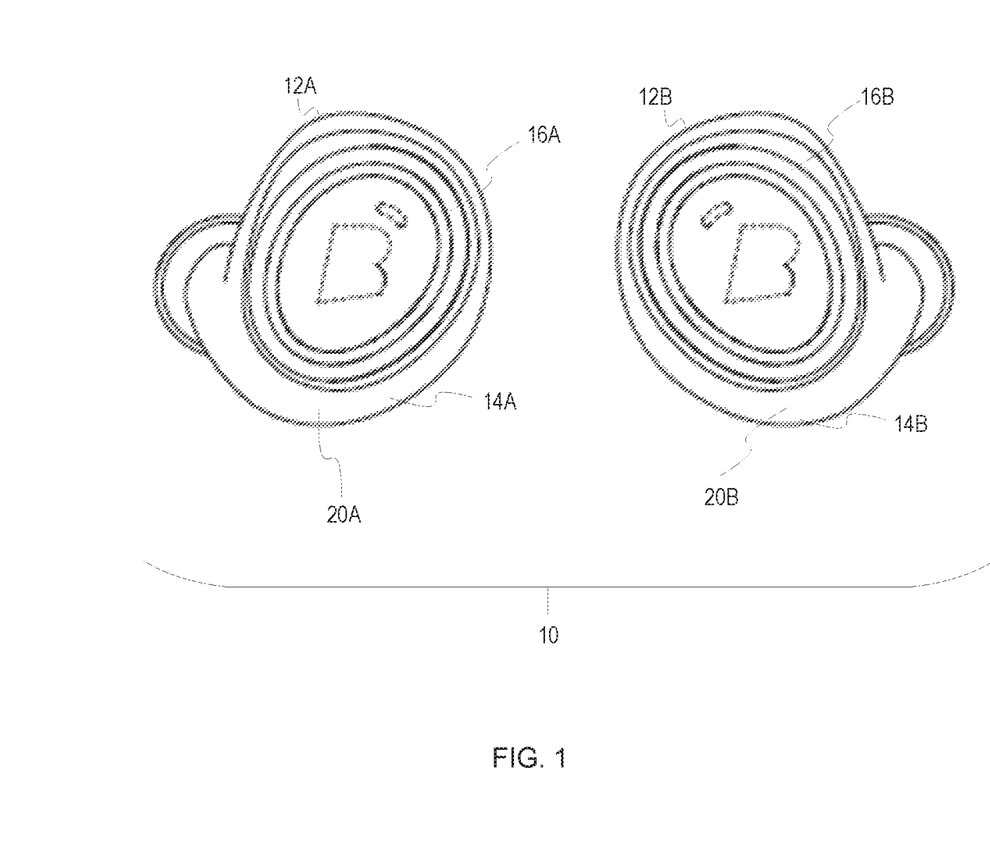
FIG. 1 is a perspective view of one embodiment of a wearable device.

FIG. 1 illustrates one example of a wearable device in the form of a set of earpieces 10 including a left ear piece 12A and a right earpiece 12B. Each of the ear pieces 12A, 12B has a housing 14A, 14B which may be in the form of a protective shell or casing. A light display area 16A, 16B is present on each of the ear pieces 12A, 12B. The light display areas 16A, 16B each provide for producing light of one or more colors. Lighting elements such as LEDS may be used as light sources to generate the light and light guides or other optics may be used to transmit the light from the light source to the display areas 16A, 16B.

Different colors of light may be used to visually indicate different information to uses. For example a visual display of red may be used to indicate that the battery is at a critically low level and needs to be recharged soon. If the battery is at a recommended charge level a visual display of yellow may be used. If the battery is at a stable level a visual display of green may be used. It is to be understood that battery level is merely one mode of operation of the device. The same lighting may be used to provide visual feedback regarding other functionality or modes of operation of the device.

In another mode of operation, the visual indicators may relate to charging of the battery using its case or other power source. For example, when the device is properly coupled to its charging case or other power source an LED (or plurality of LEDs) may show green (or another color). The LED may glow as charging initiates. If the device is not properly coupled to its charging case or seated poorly in the case then an LED (or a plurality of LEDs) may show red (or another color).

The device may be multi-modal so that based on the context of use the same visual indicators may take on different meanings. Thus, in the above examples, the visual display of red may indicate that the battery is at a critically low level and it may also indicate that the device is not properly coupled to its charging case. Thus, the same visual displays may have different meanings depending upon the mode of operation of the device.

Another mode of operation of the device relate to gestural movements. For example, where a user performs a gestural movement which is interpreted by the device the device may light or activate one or more lighting elements to confirm the gestural movement or to indicate that the gestural movement could not be interpreted.

Other modes of operation may include those associated with providing visual data, providing visual feedback, activating optional features, or other types of operations that may be desirable or appropriate for a particular device.

It is contemplated that where LEDs are used as light sources that a multi-color LED may be used such as a bicolor LED, tricolor LED or other type of LED. It is further contemplated that an array of different colored LEDs may be used. It is further contemplated that light from one or more LEDs may be communicated through a light pipe or light guide to provide a more aesthetically pleasing display to a user.

In addition to the particular colors of LEDs used, information may be communicated in other manners as well. This includes the number of LEDs or the sequencing of LEDs being lit, the duration that a LED is lit, or frequency of pulsations of light.

Figure 2:
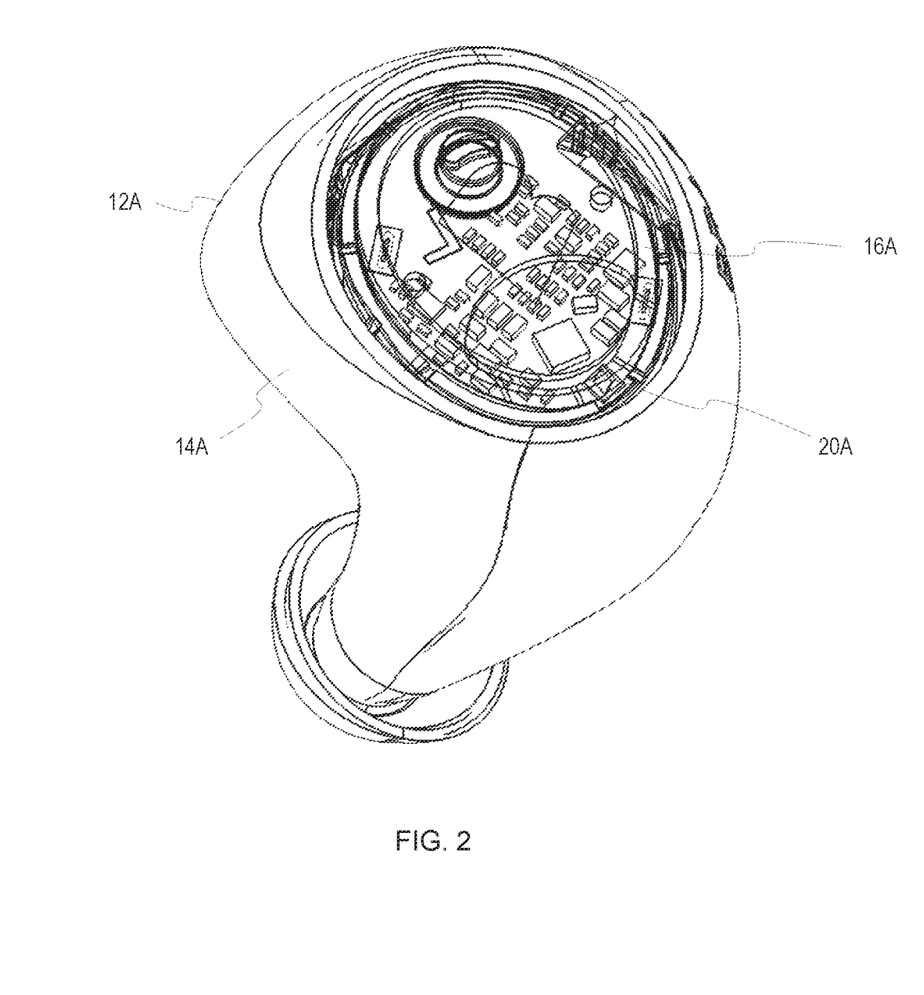
FIG. 2 is perspective view of the wearable devices from an opposite side.

FIG. 2 illustrates another view of a set of earpieces. Each of the earpieces shown includes two LEDs 20A, 22A for the first earpiece 12A and two LEDs 20B, 22B for the second earpiece 12B. More or fewer LEDs may be used.

Figure 3:
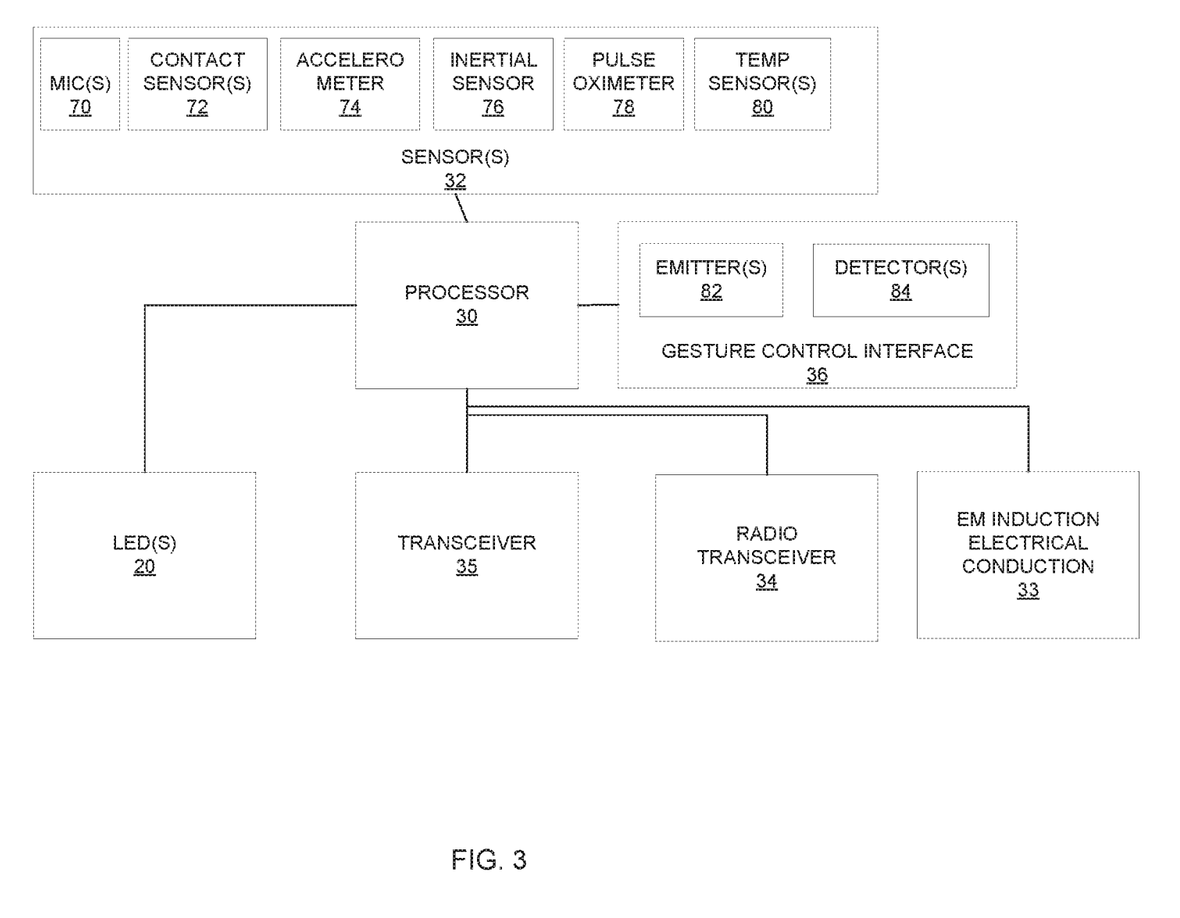
FIG. 3 is a block diagram illustrating one example of circuitry of a wearable device.

FIG. 3 is a block diagram illustrating a device. The device may include one or more LEDs electrically connected to a processor 30. The processor 30 may also be electrically connected to one or more sensors 32 and a transceiver 34 such as a short range transceiver using Bluetooth, UWB, magnetic induction, or other means of communication. In operation, the processor 30 may be programmed to convey different information using one or more of the LED(s) 20 based on context or mode of operation of the device. One way in which the processor 30 may determine the relevant mode of operation of the device is from data collected from one or more of the sensor(s) 32. For example, where the device is an earpiece, the sensor(s) may include an inertial sensor, one or more contact sensors, a bone conduction sensor, one or more microphones, a pulse oximeter, or other biological sensors. Thus, based on the status of different sensors, additional information about the mode of operation can be determined. Thus, for example, the processor may determine whether or not the earpiece is positioned on the ear in a proper position, whether or not the earpiece is being charged, or other contextual information.

Figure 4:
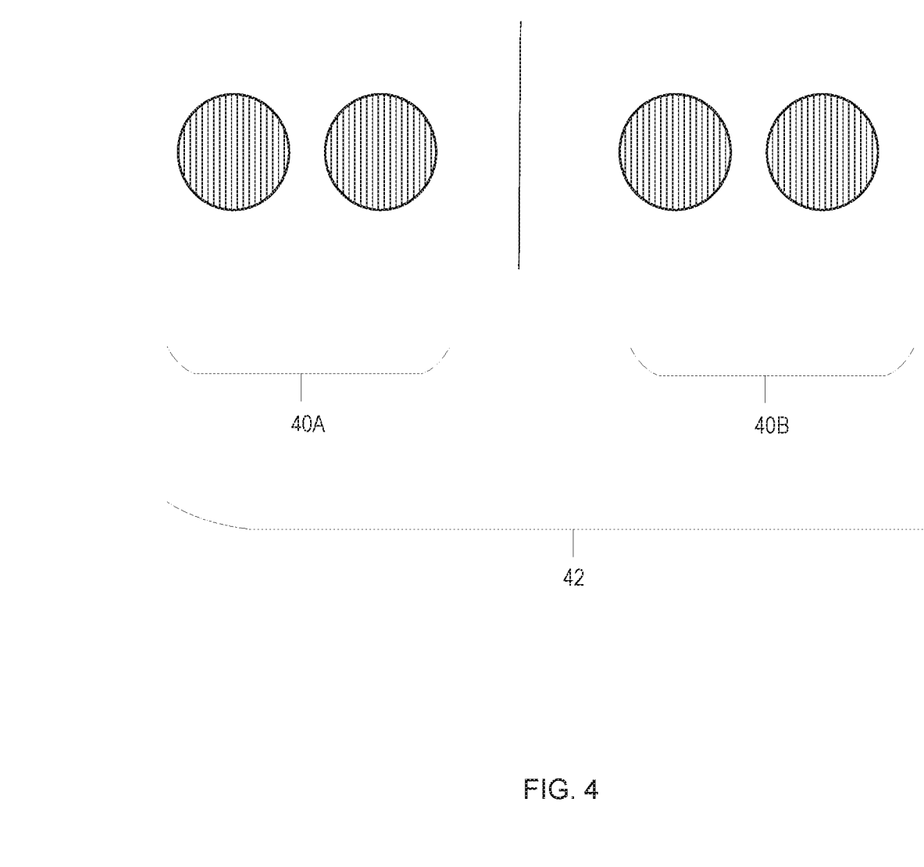
FIG. 4 illustrates an example of LEDs of different devices.

FIG. 4 illustrates an example of LEDs of different devices. In this example, note there are multiple wearable devices each with one or more LEDs. As shown in FIG. 4 this includes a set of LEDs 40A associated with a left earpiece and a set of LEDs 40B associated with a right ear piece. Thus, LEDs from multiple devices may be used in concert or in combination to convey information.

Figure 5:
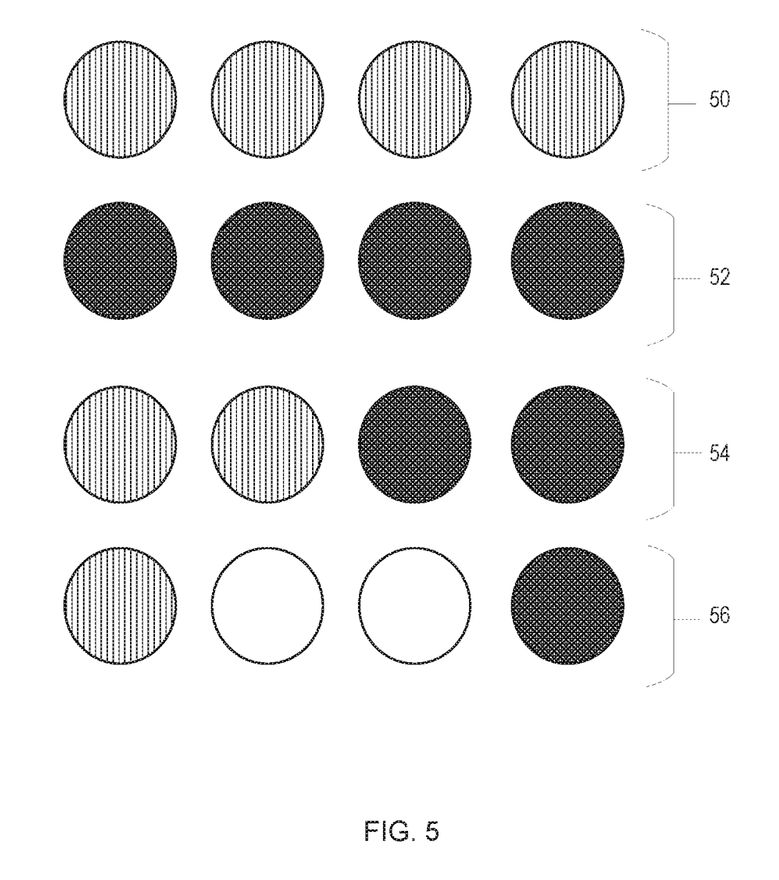
FIG. 5 illustrates further examples of communicating using LED devices.

FIG. 5 illustrates further examples of communicating using LED devices. A first configuration of LEDs 50 shows four LEDs of a first color. A second configuration of LEDs 52 shows four LEDs of a second color. A third configuration of LEDs 54 shows two LEDs of a first color and two LEDs of a second color. A fourth configuration of LEDs 56 shows one LED of a first color, two LEDs of a second color and a third LED of a third color. The four LEDs shown may be on the same ear piece or device or may be split between multiple ear pieces and devices.

Figure 6:
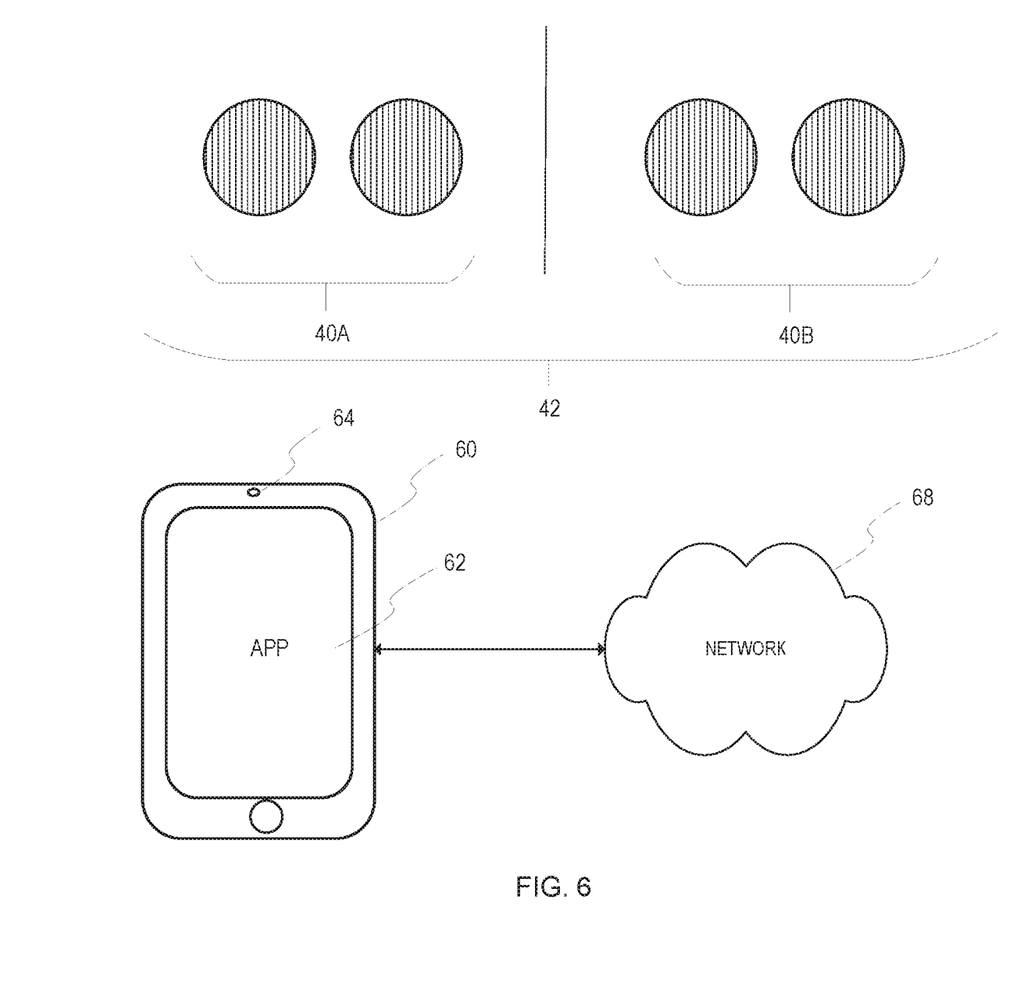
FIG. 6 illustrates an app on a mobile device programmed to visually interpret colors or patterns displayed using LEDs.

FIG. 6 illustrates an app on a mobile device programmed to visually interpret colors or patterns displayed using LEDs. A first set of LEDs 40A are associated with a first device and a second set of LEDs 40B are associated with a second device. Each of the devices may be an earpiece within a set 42 of earpieces. A mobile device 60 is also shown with a camera 64. An app 62 may be stored on a non-transitory machine readable medium of the mobile device 60 and executed on a processor of the mobile device 60. As previously explained visual indicators such as LEDs or other lighting elements may provide feedback directly to users based on mode of operation or context. It is also contemplated that the visual indicators may be used to convey information to an app or other software application. The app 62 may access a camera 64 of the mobile device 60 to acquire imagery of the visual indicators. Any type of digital data may be conveyed by turning on and off the LEDs or other lighting elements. The digital data may be encoded in any number of different ways and any number of types of information may be represented.

One use of the app 62 is to interpret trace data sent from one or more device. Another use of the app 62 is to interpret visual flashes used to convey information about debugging protocols. Another use of the app 62 is to allow for identification of user stored databases. One of the advantages of conveying information in this manner is that it does not require the use of a serial port. This may be an important advantage when the earpieces are water tight and may be used while swimming. Nor does it require the use of a Bluetooth transmitter and receiver or other short range transceiver. The information conveyed can also include embedded device data such as device build, serial number, build date, etc. as well as to provide for an alternative method for software upload, download and analysis of data. Thus, any number of different types of data may be conveyed from a wearable device using one or more LEDs.

Therefore methods, devices, and systems which provide responsive visual feedback have been shown and described. Although specific examples have been set forth herein, numerous options, variations, and alternatives are contemplated. This includes variations in the type of device, the number of devices, the type of lighting elements, the number of lighting elements, the placement of lighting elements, the colors or lighting elements, whether or not light pipes are used, and other variations.

What is claimed is:

1. An earpiece comprising:
    a water-resistant housing;
    at least one feedback element operably coupled with the housing wherein the feedback element is at least one lighting element;
    a processor disposed within the housing, the processor operably connected to the at least one lighting element; and
    a sensor operably connected to the processor;
    wherein a mode of operation of the earpiece is determined by data sent from the sensor wherein the mode of operation is a diagnostic mode;
    wherein the processor controls the lighting element based upon the mode of operation of the earpiece; and
    wherein the processor communicates information by sequencing the at least one lighting element being lit.

2. The earpiece of claim 1 wherein each of the at least one lighting element comprises a light emitting diode (LED).

3. The earpiece of claim 1 wherein the sensor comprises at least one of an inertial sensor, a biological sensor, or a contact sensor.

4. The earpiece of claim 1 wherein the mode of operation is associated with gestural movements.

5. The earpiece of claim 4 wherein the feedback element provides confirmation of the gestural movements.

6. The earpiece of claim 1 wherein the mode of operation includes assessment of embedded device data.

7. A system comprising the earpiece of claim 1 and a software application executing on a computing device wherein the software application is programmed to acquire imagery of the feedback and recover the data.

8. The system of claim 7 wherein the computing device is a mobile device.

9. A system comprising:
    a first earpiece;
    a second earpiece,
    wherein each of the first earpiece and the second earpiece comprises:
        a waterproof housing;
        at least one lighting element operably coupled to the housing;
        a processor disposed within the waterproof housing, the processor operably coupled to the at least one lighting element;
        a plurality of sensors operably coupled to the processor; and
        wherein the earpiece has several modes of operation determined by sensed data from the plurality of sensors;
        wherein the processor is programmed to control the at least one lighting element to convey visual feedback through the at least one lighting element's color and lighting sequence based on one of the modes of operation being a diagnostic mode; and wherein the diagnostic mode of operation provides for the lighting sequence to convey information about debugging protocols;

wherein the first earpiece and the second earpiece are configured to work in concert to convey visual feedback.

10. The system of claim 9 wherein the mode of operation is confirmation of a gestural movement.

11. The system of claim 10 wherein the first or second earpiece has no buttons.

12. A method of providing responsive visual feedback from an earpiece comprising:

providing an earpiece comprising:

a housing, at least one lighting element associated with the housing;

a processor disposed within the earpiece housing, the processor operably coupled to the at least one lighting element; and a plurality of sensors operably coupled to the processor;

determining by the processor a mode of operation for the earpiece using sensed data from the plurality of sensors of the earpiece wherein the mode of operation is a diagnostic mode; and controlling the at least one lighting element of the earpiece based on the diagnostic mode of operation of the earpiece determined by the processor to assist a user in debugging the earpiece.

13. The method of claim 12 wherein the at least one feedback element is a lighting element.

14. The method of claim 13 wherein the at least one lighting element is a multicolor lighting element.

15. The method of claim 14 wherein the housing is water resistant.

16. The method of claim 15 further comprising the step of confirming a gestural movement.

17. The method of claim 16 further comprising the step of assessing embedded device data.

18. The method of claim 17 further comprising the step of executing a software application on a computing device wherein the software application is programmed to acquire imagery of the feedback and recover the data.

* * * * *